(12) United States Patent
Terao et al.

(10) Patent No.: US 8,734,908 B2
(45) Date of Patent: May 27, 2014

(54) RESIN-COATED METAL PIGMENT, METHOD FOR PRODUCING THE SAME, AND WATER BASE PAINT USING THE SAME

(75) Inventors: Wataru Terao, Kashiwara (JP); Yasushi Takano, Kashiwara (JP); Shunichi Setoguchi, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 0 days.

(21) Appl. No.: 13/605,219

(22) Filed: Sep. 6, 2012

(65) Prior Publication Data

US 2012/0329946 A1 Dec. 27, 2012

Related U.S. Application Data

(62) Division of application No. 11/991,840, filed as application No. PCT/JP2006/320255 on Oct. 11, 2006, now Pat. No. 8,283,397.

(30) Foreign Application Priority Data

Oct. 31, 2005 (JP) ................ 2005-316087

(51) Int. Cl.
*C08K 5/49* (2006.01)
*C08K 3/10* (2006.01)
*C09D 5/00* (2006.01)
*C09C 1/62* (2006.01)
*C09D 7/12* (2006.01)
*C09D 5/02* (2006.01)
*C08K 9/04* (2006.01)

(52) U.S. Cl.
CPC .............. *C09D 7/1225* (2013.01); *C09D 5/028* (2013.01); *C08K 9/04* (2013.01)
USPC ............... 427/385.5; 106/287.29; 106/403; 524/127; 524/849; 524/115; 524/121; 264/7

(58) Field of Classification Search
CPC ........ C09D 7/1225; C09D 5/028; C09D 5/00; C09C 1/644; C09C 1/62; C08K 9/04; C08K 5/49; C08K 3/10
USPC ............. 106/290, 287.29, 403; 524/127, 849, 524/115, 121; 264/7; 427/385.5
See application file for complete search history.

(56) References Cited

U.S. PATENT DOCUMENTS

| 4,750,940 A * | 6/1988 | Higashi et al. ................ 524/439 |
| 2003/0066457 A1 | 4/2003 | Hashizume et al. |
| 2006/0063004 A1 | 3/2006 | Takano et al. |

FOREIGN PATENT DOCUMENTS

| EP | 0 583 919 A1 | 2/1994 |
| JP | 58-141248 A | 8/1983 |
| JP | 62-81460 A | 4/1987 |
| JP | 82-253668 A | 11/1987 |
| JP | 64-40566 A | 2/1989 |
| JP | 1-49746 B2 | 10/1989 |
| JP | 2-49076 A | 2/1990 |
| JP | 2-120368 A | 5/1990 |
| JP | 6-57171 A | 3/1994 |
| JP | 2000-44835 A | 2/2000 |
| JP | 2002-226733 A | 8/2002 |
| JP | 2005-146111 A | 6/2005 |
| JP | 2005-240013 A | 9/2005 |
| KR | 1999-007854 A | 1/1990 |
| WO | WO 96/38506 A1 | 12/1996 |
| WO | WO 02/31061 A1 | 4/2002 |
| WO | WO 2005/007755 A1 | 1/2005 |

OTHER PUBLICATIONS

Japanese Office Action issued on Mar. 2, 2010 in corresponding Japanese Patent Application No. 2005-316087 with its English translation.
Korean Decision for Grant of Patent for Application No. 2008-7008951 dated May 15, 2013 (with English translation).

* cited by examiner

*Primary Examiner* — James J Seidleck
*Assistant Examiner* — Deve E Valdez
(74) *Attorney, Agent, or Firm* — Birch, Stewart, Kolasch & Birch, LLP (57) ABSTRACT

The present invention provides a resin-coated metal pigment capable of achieving both of water resistance of a water base paint and chemical resistance of a film at a high level, and a water base paint using the resin-coated metal pigment. The present invention provides a method for producing a resin-coated metal pigment including an adsorption step of bringing a solution or a dispersion liquid of a phosphate ester component (A) into contact with a metal pigment to prepare a phosphate ester adsorbing metal pigment, a slurry preparation step of preparing a slurry for polymerization obtained by dissolving a polymerization component (B) therein, and a coating step of polymerizing the polymerization component (B) to form a resin coating layer on the surface of the phosphate ester adsorbing metal pigment; a resin-coated metal pigment obtained by the method; and a water base paint using the resin-coated metal pigment.

9 Claims, 1 Drawing Sheet

RESIN-COATED METAL PIGMENT, METHOD FOR PRODUCING THE SAME, AND WATER BASE PAINT USING THE SAME

This application is a Divisional that claims benefit of application Ser. No. 11/991,840 filed on Mar. 12, 2008 now U.S. Pat. No. 8,283,397 under 35 U.S.C. §120, which is the national phase of PCT International Application No. PCT/JP2006/320255 filed on Oct. 11, 2006 under 35 U.S.C. §371, which claims benefit under 35 U.S.C. §119(a) to Patent Application No. 2005-316087 filed in Japan, on Oct. 31, 2005. The entire contents of each of the above-identified applications are hereby incorporated by reference.

TECHNICAL FIELD

The present invention relates to a resin-coated metal pigment contained in a metallic paint or the like for use in painting of a metal or a plastic. More specifically, the present invention relates to a resin-coated metal pigment having excellent paint storage stability, in particular, water resistance when being used as a water base paint, and exhibiting excellent chemical resistance when being formed into a film.

BACKGROUND ART

From heightened concern for an environmental problem, a water base paint or a powder paint has recently attracted the attention as low pollution-type paints without using an organic solvent. Even in the case of these paints, metallic decorative property is required in a diverse range of applications as in a conventional organic solvent-based paint, and therefore use of a metal pigment is indispensable. In powder coating, an article to be coated is substantially limited to those containing metal, due to restrictions of electrostatic coating and high-temperature baking. On the other hand, when a metal pigment is used for a water base paint, the metal pigment may react with water in the paint and turn into black or generate a hydrogen gas in some cases, thus causing a problem of poor storage stability of the paint.

The technologies for improving the storage stability of the paint include the followings. Japanese Patent Laying-Open No. 2-120368 (Patent Document 1) proposes that a mixture of an organophosphate ester having an ester residue containing a saturated aliphatic group and containing no unsaturated aliphatic group, and an organophosphate ester having an ester residue containing an unsaturated aliphatic group is used as a pigment component. Japanese Patent Laying-Open No. 6-57171 (Patent Document 2) proposes that the surface of an aluminum flake is coated with a film of molybdic acid. International Publication WO02/031061 Pamphlet (Patent Document 3) proposes an aluminum pigment capable of forming a film derived from peroxymolybdic acid, and also contains at least one amine selected from among an alkylamine, an arylamine, an alkanolamine and an alkoxylamine.

However, the metal pigment obtained by these technologies is excellent in storage stability as a water base paint, but is inferior in chemical resistance when formed into a film. Accordingly, the use is practically limited only to the case where overcoat is applied, and thus there is a problem such as low versatility.

On the other hand, in plastic coating of a cellular phone and a personal computer, since the article has to be ready for actual use after coating just once from the viewpoint of cost, excellent chemical resistance is also required for the film in these applications. In order to solve the problem, Japanese Patent Laying-Open No. 62-081460 (Patent Document 4) proposes a metal powder coated with a copolymer of trimethylolpropane triacrylate and/or trimethylolpropane trimethacrylate and a small amount of acrylic acid and/or methacrylic acid. Japanese Patent Publication No. 01-049746 (Patent Document 5) proposes a resin-coated metal pigment, wherein the surface of the metal pigment is coated by strong adhesion with a highly three-dimensionalized resin made from a radical polymerizable unsaturated carboxylic acid and/or a phosphate mono- or di-ester having a radical polymerizable double bond and a monomer having 3 or more radical polymerizable double bonds, and the alkali resistance is 1.0 or less and the pigment is not substantially agglomerated in a heat resistance stability test. Japanese Patent Laying-Open No. 64-040566 (Patent Document 6) proposes an aluminum flake having microscopically smooth surface, which is uniformly coated with a copolymer obtained by reacting at least two compounds selected from the group consisting of oligomers and monomers having at least one polymerizable double bond. Japanese Patent Laying-Open No. 2005-146111 (Patent Document 7) proposes a resin-coated aluminum pigment wherein the surface of a material aluminum pigment is coated with a copolymer obtained by polymerizing a monomer having a polymerizable double bond, a monomer having a polymerizable double bond and a benzene ring, and (meth)acrylic acid.

Although these technologies satisfy the market needs in the application to an organic solvent-based paint, there remains a problem that water resistance is not sufficient in the application to a water base paint. Commonly, the chemical resistance may not be improved by a surface treatment for imparting water resistance, while the water resistance may not be improved by a surface treatment for imparting chemical resistance. As a result, it is difficult to achieve both of water resistance and chemical resistance at a sufficiently practicable level.

As a surface treatment technology combining water resistance and chemical resistance, International Publication WO96/038506 Pamphlet (Patent Document 8) proposes a resin-coated metal pigment, wherein (A) at least one kind selected from among a radical polymerizable unsaturated carboxylic acid, and/or a phosphate or phosphonate mono- or di-ester having a radical polymerizable double bond, and/or a coupling agent having a radical polymerizable double bond, (B) a monomer having 3 or more radical polymerizable double bonds and (C) a polymerization initiator are used, which is produced by adding the component (A) first to treat the metal pigment, and then gradually adding at least one of the components (B) and (C) to form a polymerized resin layer on the surface. Japanese Patent Laying-Open No. 2000-044835 (Patent Document 9) proposes a resin-coated metal pigment that is prepared by dispersing a metal pigment obtained by a physical vapor deposition film crushing method in an organic solvent, adding (A) at least one kind selected from a radical polymerizable unsaturated carboxylic acid, a phosphate or phosphonate mono- or di-ester having a radical polymerizable double bond and a coupling agent having a radical polymerizable double bond, and further adding (B) a monomer having 3 or more radical polymerizable double bonds and (C) a polymerization initiator, in which at least one of the components (B) and (C) is gradually added, followed by polymerization.

However, in the above patent documents, the water resistance is evaluated by an amount of gas generated as measured at 50° C. for 24 hours using a paint having a pH adjusted to 9.5. Under these conditions, alkali resistance is substantially evaluated, and therefore water resistance is not properly evaluated. In recent years, the pH of a water base paint is commonly adjusted within a range from about 7.5 to 8.8, and water resistance is commonly evaluated by the generation of gas during at least several days.

In other words, the needs for a low-pollution water base metallic paint with high versatility is increasing more and more, but the technology capable of achieving both of water resistance and chemical resistance at a sufficiently practicable level has never been completed.

Patent Document 1: Japanese Patent Laying-Open No. 2-120368
Patent Document 2: Japanese Patent Laying-Open No. 6-57171
Patent Document 3: International Publication WO02/031061 Pamphlet
Patent Document 4: Japanese Patent Laying-Open No. 62-081460
Patent Document 5: Japanese Patent Publication No. 01-049746
Patent Document 6: Japanese Patent Laying-Open No. 64-040566
Patent Document 7: Japanese Patent Laying-Open No. 2005-146111
Patent Document 8: International Publication WO96/038506 Pamphlet
Patent Document 9: Japanese Patent Laying-Open No. 2000-044835

DISCLOSURE OF THE INVENTION

Problems to be Solved by the Invention

An object of the present invention is to solve the above problems and to provide a resin-coated metal pigment capable of improving paint stability, particularly water resistance of a water base paint, and securing chemical resistance of a film formed by applying the water base paint at a sufficiently practicable level, and a highly versatile low-pollution water base paint using the resin-coated metal pigment.

Means for Solving the Problems

The present invention relates to a method for producing a resin-coated metal pigment including an adsorption step of bringing a solution of a phosphate ester component (A) containing phosphate mono- and/or diesters having a radical polymerizable double bond, or a dispersion liquid containing the phosphate ester component (A) dispersed in a solvent into contact with a metal pigment to prepare a phosphate ester adsorbing metal pigment containing a phosphate ester adsorbed on the surface of the metal pigment, a slurry preparation step of preparing a slurry for polymerization obtained by dispersing the phosphate ester adsorbing metal pigment in a solvent for polymerization and dissolving a polymerization component (B) including a monomer and/or an oligomer having at least one polymerizable double bond in the solvent for polymerization, and a coating step of polymerizing the polymerization component (B) to form a resin coating layer on the surface of the phosphate ester adsorbing metal pigment, wherein the dispersion liquid is obtained by mixing a solution obtained by dissolving the phosphate ester component (A) in a first solvent, with a second solvent, and the solvent for polymerization is a solvent having solubility at 25° C. of the phosphate ester component (A) of 10 g or less with respect to 100 g of the solvent.

The present invention also relates to a method for producing a resin-coated metal pigment, wherein the slurry preparation step includes the steps of preparing a pigment slurry in which the phosphate ester adsorbing metal pigment is dispersed in the solvent for polymerization, and mixing the polymerization component (B) with the pigment slurry.

The present invention also relates to a method for producing a resin-coated metal pigment, further including, after the absorption step, a step of polymerizing the phosphate ester adsorbed to the phosphate ester adsorbing metal pigment.

The present invention also relates to a method for producing a resin-coated metal pigment, wherein a polar solvent is used as the solvent in the solution of the phosphate ester component (A).

The present invention also relates to a method for producing a resin-coated metal pigment, wherein the same kind of a solvent is used as the second solvent and the solvent for polymerization.

The present invention also relates to a method for producing a resin-coated metal pigment, wherein the phosphate ester component (A) is 2-methacryloyloxyethyl acid phosphate.

The present invention also relates to a method for producing a resin-coated metal pigment, wherein a phosphorus content per unit surface area of the resin-coated metal pigment is within a range from 0.05 to 1.3 mg/m².

The present invention also relates to a method for producing a resin-coated metal pigment, wherein the polymerization component (B) includes a monomer having at least two polymerizable double bonds.

The present invention also relates to a resin-coated metal pigment including a metal pigment, a phosphate ester layer, and a resin coating layer that coats the metal pigment with the phosphate ester layer interposed therebetween, wherein the phosphate ester layer is made of phosphate mono- and/or di-esters having a radical polymerizable double bond, or a homopolymer or a copolymer of phosphate mono- and/or di-esters, the resin coating layer is made of a homopolymer or a copolymer obtained by polymerizing a monomer and/or an oligomer having at least one polymerizable double bond, and a phosphorus content per unit surface area of the resin-coated metal pigment is within a range from 0.05 to 1.3 mg/m².

The present invention also relates to a resin-coated metal pigment, wherein the phosphate ester layer is made of 2-methacryloyloxyethyl acid phosphate.

The present invention also relates to a water base paint including the resin-coated metal pigment and a binder.

Effects of the Invention

According to the present invention, it is possible to provide a resin-coated metal pigment capable of achieving storage stability, particularly water resistance when being used as a water base paint and chemical resistance of a film at a sufficiently practicable level.

DESCRIPTION OF THE REFERENCE SIGNS

11: Reactor, 12: Screw cap, 13: Two-way cock, 14: Dry bath with stirrer, 15,18: Teflon (registered trademark) tube, 17: Water bath, 19: Measuring cylinder

BEST MODES FOR CARRYING OUT THE INVENTION

A method for producing a resin-coated metal pigment of the present invention is characterized by uniformly adsorbing a phosphate ester having a radial polymerizable double bond on the surface of a metal pigment to form a resin coating layer, and includes an adsorption step of bringing a solution of a phosphate ester component (A) containing phosphate mono- and/or diesters having a radical polymerizable double bond, or a dispersion liquid containing the phosphate ester component (A) dispersed in a solvent into contact with a metal pigment to prepare a phosphate ester adsorbing metal pigment containing a phosphate ester adsorbed on the surface of the metal pigment, a slurry preparation step of preparing a slurry for polymerization, obtained by dispersing the phosphate ester adsorbing metal pigment in a solvent for polymerization and dissolving a polymerization component (B) including a monomer and/or an oligomer having at least one polymerizable double bond in the solvent for polymerization, and a coating step of polymerizing the polymerization component (B) to form a resin coating layer on the surface of the phosphate ester adsorbing metal pigment.

That is, in the present invention, the phosphate ester is adsorbed on the surface of the metal pigment and then the resin coating layer is formed. The phosphate ester used in the present invention serves as a corrosion inhibitor for the surface of the metal pigment, while the resin coating layer used in the present invention has an action for improving the chemical resistance of the metal pigment. Accordingly, the method of uniformly adsorbing the phosphate ester on the surface of the metal pigment and then uniformly forming the resin coating layer over the phosphate ester adsorbing metal pigment provides a resin-coated metal pigment for imparting excellent water resistance when being used as a paint and excellent chemical resistance when being formed into a film.

The phosphate ester component (A) used in the present invention is adsorbed on the surface of the metal pigment by the adsorption action of an OH group in the molecule to the surface of the metal pigment. On the other hand, the phosphate ester component (A) used in the present invention has a radical polymerizable double bond, and the polymerization component (B) used in the present invention has at least one polymerizable double bond. Therefore, the phosphate ester adsorbed on the surface of the metal pigment in the adsorption step forms a covalent bond with the polymerization component (B) in the following coating step, and thus exerting the effect of exhibiting strong adhesiveness between the metal pigment and the resin coating layer with the phosphate ester interposed therebetween.

<Adsorption Step>

In the adsorption step in the production method of the present invention, a solution of the phosphate ester component (A) or a dispersion liquid composed of the phosphate ester component (A) dispersed in a solvent is brought into contact with the metal pigment. The dispersion liquid is prepared by dissolving the phosphate ester component (A) in a first solvent and then mixing the resultant solution with a second solvent. The method makes it possible to finely disperse the phosphate ester component (A) in the dispersion liquid. That is to say, since the phosphate ester component (A) is brought into contact with the metal pigment in a dissolving state or finely dispersed state in the present invention, the phosphate ester is adsorbed uniformly on the surface of the metal pigment.

As the treatment method, wherein the phosphate ester is brought into contact with the metal pigment in a dissolving state using a solvent dissolving the phosphate ester component (A), thereby uniformly adsorbing the phosphate ester, for example, the following method can be exemplified. The metal pigment is often commercially available in a paste form containing solvent(s) such as an aliphatic hydrocarbon and/or an aromatic hydrocarbon, alone or in combination of two or more kinds of these solvents as a mixture solvent. These solvents are commonly those that do not dissolve a phosphate mono- or di-ester having a radical polymerizable double bond (nonsolvent) or that do dissolve but have low solubility (poor solvent).

A method for preparing the solution of the phosphate ester component (A) in the present invention includes a method of preliminarily replacing a solvent in a metal pigment paste with a solvent that dissolves the phosphate ester component (A), followed by the addition of the phosphate ester component (A) and further kneading. The phosphate ester component (A) may be added as it is, or after diluting with a solvent that dissolves the phosphate ester component (A).

It is also possible to employ a method in which the metal pigment paste is diluted with a solvent that dissolves the phosphate ester component (A) and the phosphate ester component (A) is added thereto, and then the mixture is kneaded or stirred. However, in this case, an aliphatic hydrocarbon or aromatic hydrocarbon or the mixture solvent thereof (i.e., a poor solvent for the phosphate ester component (A)) originated from the metal pigment paste and a solvent that dissolves the phosphate ester component (A) (i.e., a good solvent for the phosphate ester component (A)) end up to be mixed in the system. Therefore, it is necessary that the amount of the good solvent to be added is controlled to have the composition that allows the phosphate ester component (A) to be dissolved.

It is also possible to employ a method, in which the metal pigment paste is preliminarily replaced with a good solvent for the phosphate ester component (A), the metal pigment paste is dispersed in the good solvent to make a slurry, and the phosphate ester component (A) is added to the resultant slurry with stirring. In this method, the next polymerization reaction may be performed directly, or the phosphate ester adsorbing metal pigment may be isolated in a paste form by filtration and then supplied to the next step. In the case of performing the filtration operation, when the amount of the phosphate ester component (A) to be added exceeds the saturated adsorption amount of the phosphate ester component (A) onto a pigment particle, the excess phosphate ester component (A) is discharged outside the system together with the filtrate.

It is also possible to employ a method, in which the metal pigment paste is dispersed in a good solvent for the phosphate ester component (A) as it is to make a slurry, and the phosphate ester component (A) is added to the resultant slurry with stirring. In this method, since a poor solvent originated from the metal pigment paste and a good solvent end up to be mixed in the system, the amount of the good solvent needs to be controlled so as to have a composition that allows the phosphate ester component (A) to be dissolved. Either is possible that the slurry is directly served for the next polymerization reaction, or that the slurry is filtered to isolate the phosphate ester adsorbing metal pigment in a paste form. In the case of performing the filtration operation, when the amount of the phosphate ester component (A) to be added exceeds the saturated adsorption amount of the phosphate ester component (A) onto the pigment particle, the excess phosphate ester component (A) is discharged outside the system together with the filtrate.

When a dispersion liquid of the phosphate ester component (A) is used in the present invention, the adsorption step can be carried out as follows. The phosphate ester component (A) is dissolved in a first solvent, and the resultant solution is mixed with a second solvent to prepare a dispersion liquid in which the phosphate ester component (A) is finely dispersed. In this case, a good solvent for the phosphate ester component (A) is used as the first solvent, while a poor solvent for the phosphate ester component (A) or a solvent that does not dissolve the phosphate ester component (A) at all is used as the second solvent.

It is possible to employ a method, in which the metal pigment paste is preliminarily replaced with the second solvent, the metal pigment paste is dispersed in the second solvent to make a slurry, and the dispersion liquid of the phosphate ester component (A) or a solution containing the phosphate ester component (A) and the first solvent is slowly added to the resultant slurry over 10 minutes or more with stirring. According to the method, the phosphate ester component (A) phase-separated in the second solvent is uniformly adsorbed on the entire surface of the metal pigment. Either is possible that the next polymerization reaction is carried out after the adsorption step as it is, or the phosphate ester adsorbing metal pigment is isolated in a paste form by filtration and then supplied to the next step. However, in the case of performing the filtration operation, when the amount of the phosphate ester component (A) to be added exceeds the saturated adsorption amount of the phosphate ester component (A) onto the pigment particle, the excess phosphate ester component (A) is discharged outside the system together with the filtrate.

It is also possible to employ a method in which the metal pigment paste is dispersed as it is in the second solvent to make a slurry, a dispersion liquid of the phosphate ester component (A) or a solution containing the phosphate ester component (A) and the first solvent is slowly added to the resultant slurry over 10 minutes or more with stirring, and the phase-separated phosphate ester component (A) is adsorbed on the surface of the metal pigment. In this method, since a poor solvent originated from the metal pigment paste and the second solvent end up to be mixed in the system, the amount of the second solvent needs to be controlled so as to have a composition that allows the phosphate ester component (A) to maintain a finely dispersed state. Either is possible that the slurry is directly served for the next polymerization reaction, or that the slurry is filtered to isolate the phosphate ester adsorbing metal pigment in a paste form. In the step accompanied by the filtration operation, when the amount of the phosphate ester component (A) to be added exceeds the saturated adsorption amount of the phosphate ester component (A) to the pigment particle, the excess phosphate ester component (A) is discharged outside the system together with the filtrate.

The paste or slurry in which the phosphate ester component (A) is adsorbed on the metal pigment in the adsorption step is used for a next polymerization step. The paste or slurry obtained in the adsorption step may be used as it is or may be subjected to solvent replacement before use. For example, when the amount of the phosphate ester component (A) to be added exceeds the saturated adsorption amount of the phosphate ester component (A) onto the pigment particle, if the resultant paste or slurry is preliminarily dispersed in a poor solvent for the phosphate ester component (A), the excess phosphate ester component (A) is phase-separated or precipitated to be adsorbed onto the metal pigment. Thus, the excess phosphate ester component (A) is not discharged outside the system by filtration. Solvent replacement may be carried out for such a purpose or out of constraint of the next polymerization step.

The present invention may further include a step of polymerizing the phosphate ester absorbed to the phosphate ester adsorbing metal pigment after the adsorption step. In this case, the phosphate ester can be adsorbed more strongly to the surface of the metal pigment. When a dispersion liquid of the phosphate ester component (A) is used, a dispersing agent may be added to the first or second solvent, if necessary, for the purpose of accelerating fine dispersion of the phosphate ester component (A).

<Metal Pigment>

Examples of the metal pigment used for the present invention include, but are not limited to, flakes of metal such as aluminum, zinc, copper, bronze, nickel, titanium and stainless, and alloy flakes thereof. Among these metal pigments, an aluminum flake is particularly preferred because it is excellent in metallic luster and is inexpensive, and is also easy to handle due to the low specific gravity.

The metal pigment used in the present invention is preferably in a flake form for use as a pigment for a metallic paint. The average particle size of the metal pigment is preferably from about 1 to 100 μm, in general, and more preferably from 3 to 60 μm. The average thickness of the metal pigment is preferably from about 0.01 to 5 μm, in general, and more preferably from 0.02 to 2 μm.

When the average particle size of the metal pigment is 1 μm or more, metallic feeling or brightness feeling is excellent, and when the average particle size is 100 μm or less, a flaked particle is less likely to stick out on the surface of the film and the smoothness or shininess on the paint surface is favorable. When the average thickness of the metal pigment is 0.01 μm or more, there are such advantages as higher strength and excellent workability during the production steps, and when the average thickness is 5 μm or less, there are such advantages as low production cost in addition to excellent smoothness or shininess on the paint surface.

The average particle size of the metal pigment is determined by calculating a volume average out of particle size distribution data measured by a known particle size distribution measurement method such as laser diffraction, a micromesh sieve or Coulter counter method. Further, the average thickness is calculated from hiding power and density of the metal pigment.

On the surface of the metal pigment used in the present invention, a grinding aid added upon grinding may be adsorbed. Examples of the grinding aid include fatty acids such as oleic acid and stearic acid, aliphatic amines, aliphatic amides, aliphatic alcohols and ester compounds. These substances have effects of suppressing unnecessary oxidation on the surface of the metal pigment and improving luster. The adsorption amount of the grinding aid is preferably less than 2 parts by mass based on 100 parts by mass of the metal pigment. When the amount is less than 2 parts by mass, there is an advantage that the surface luster is less likely to degrade.

In order to provide diverse colors to the metal pigment used in the present invention, various colorants and color pigments can be adhered on the surface of the metal pigment.

Examples of the colorant and the coloring pigment include, but are not particularly limited to, quinacridone, diketo-pyrrolo-pyrrole, isoindolinone, indanthrone, perylene, perinone, anthraquinone, dioxazine, benzoimidazolone, triphenylmethane quinophthalone, anthrapyrimidine, chrome yellow, pearl mica, transparent pearl mica, colored mica, interference mica, phthalocyanine, halogenated phthalocyanine, azo pigments (azomethine metal complexes, condensed azo pigments), titanium oxide, carbon black, iron oxide, copper phthalocyanine, condensed polycyclic pigments, and the like.

A method of adhering a color pigment to the metal pigment used in the present invention is not particularly limited, but is preferably a method in which a color pigment is coated with a dispersing agent and the resultant color pigment is mixed with the metal pigment in a non-polar solvent with stirring to adhere the color pigment to the metal pigment.

As the dispersing agent, aromatic carboxylic acids such as benzoic acid, vinyl benzoate, salicylic acid, anthranilic acid, m-aminobenzoic acid, p-aminobenzoic acid, 3-amino-4-methylbenzoic acid, 3,4-diaminobenzoic acid, p-aminosalicylic acid, 1-naphthoic acid, 2-naphthoic acid, naphthenic acid, 3-amino-2-naphthoic acid, cinnamic acid and aminocinnamic acid; amino compounds such as ethylenediamine, trimethylenediamine, tetramethylenediamine, pentamethylenediamine, hexamethylenediamine, 1,7-diaminoheptane, 1,8-diaminooctane, 1,10-diaminodecane, 1,12-diaminododecane, o-phenylenediamine, m-phenylenediamine, p-phenylenediamine, 1,8-diaminonaphthalene, 1,2-diaminocyclohexane, stearylpropylenediamine, N-β-(aminoethyl)-γ-aminopropyltrimethoxysilane and N-β-(aminoethyl)-γ-aminopropylmethyldimethoxysilane; aluminum or titanium chelate compounds; and the like are preferably used.

Similarly, in order to provide diverse colors to the metal pigment used in the present invention, an interference film or the like can be formed on the surface of the metal pigment. The method is not particularly limited. However, for example, in order to form an optical interference oxidation film on the surface of each particle of the metal pigment, the method is preferably a method in which the metal pigment is heated to about 300 to 700° C. in an atmosphere where the amount of oxygen is controlled to form an air oxidation film on the surface, or a method of coating the metal pigment in a flake form with a precursor of an oxide of a transition metal or the like, followed by thermolysis.

<Phosphate Ester Component (A)>

It is generally known that phosphoric acid or a phosphate mono- or di-ester is adsorbed onto the surface of a metal to act as an adsorption-type metal corrosion inhibitor. The phosphate mono- and/or di-ester having a radical polymerizable double bond used as a phosphate ester component (A) in the present invention is a substance that has both functions of adsorption-type metal corrosion inhibitor and radical polymerizability. Water resistance as one of the properties that the resin-coated metal pigment prepared by the present invention has is considered to be attained by uniformly adsorbing the phosphate ester component (A) over the surface of the metal pigment to polymerize.

Specific examples of the preferable phosphate ester component (A) used in the present invention include 2-methacryloyloxyethyl acid phosphate, di-2-methacryloyloxyethyl acid phosphate, tri-2-methacryloyloxyethyl acid phosphate, 2-acryloyloxy ethyl acid phosphate, di-2-acryloyloxy ethyl acid phosphate, tri-2-acryloyloxy ethyl acid phosphate, diphenyl-2-methacryloyloxyethyl acid phosphate, diphenyl-2-acryloyloxy ethyl acid phosphate, dibutyl-2-methacryloyloxyethyl acid phosphate, dibutyl-2-acryloyloxy ethyl acid phosphate, dioctyl-2-methacryloyloxyethyl acid phosphate, dioctyl-2-methacryloyloxyethyl acid phosphate, dioctyl-2-acryloyloxy ethyl acid phosphate, 2-methacryloyloxy propyl acid phosphate, bis(2-chloroethyl)vinyl phosphonate, diallyldibutyl phosphonosuccinate, and the like. These phosphate ester components can be used alone or in combination of two or more kinds. Examples of the more preferable phosphate ester component (A) are phosphoric monoesters such as 2-methacryloyloxyethyl acid phosphate and 2-acryloyloxy ethyl acid phosphate. Particularly, 2-methacryloyloxyethyl acid phosphate is preferably used.

The phosphate ester component (A) of the present invention may be constituted only by phosphate mono- and/or di-esters having radical polymerizability, but may further contain phosphate mono- and/or di-esters having no radical polymerizable double bond. Examples of the phosphate mono- and/or di-esters having no radical polymerizable double bond include methyl acid phosphate, ethyl acid phosphate, butyl acid phosphate, isodecyl acid phosphate, phenylphosphonic acid, 2-ethylhexyl acid phosphate, lauryl acid phosphate, stearyl acid phosphate, oleyl acid phosphate, dimethyl acid phosphate, diethyl acid phosphate, dibutyl acid phosphate, diisodecyl acid phosphate, di-2-ethylhexyl acid phosphate, dilauryl acid phosphate, distearyl acid phosphate, dioleyl acid phosphate, and the like.

<Solvent for Solution of Phosphate Ester Component (A)>

As a solvent for preparing a solution of the phosphate ester component (A) used in the present invention, a solvent dissolving the phosphate ester component (A) may be used, and a single solvent or a mixture solvent of two or more kinds of the solvents may be used. A preferred solvent differs depending on the composition of the phosphate ester component (A), and an optimum solvent may be selected in view of combination with the phosphate ester component (A) to be used.

Since a unit of phosphoric acid exhibits strong polarity, the solvent dissolving the phosphate ester component (A) is limited to a polar solvent, and ketones and alcohols are recommended. Among polar solvents, water and basic solvents are inadequate. In the case of using water, when an aluminum pigment or the like is used as the metal pigment, water and aluminum are reacted to generate hydrogen gas. In the case of using a basic solvent, since the basic solvent forms a salt together with an acidic unit of phosphoric acid, the phosphate ester component (A) may be insolubilized or may fail to be adsorbed on the surface of the metal pigment.

As the above solvent, the solvent having a SP value within a range from 9.1 to 13, more preferably from 9.2 to 10.0, are preferably used. The solvent having a SP value within the above range is preferred because it is particularly excellent in solubility to the phosphate ester component (A) used in the present invention. Incidentally, the SP value in the present invention denotes a solubility parameter.

As the above solvent, the solvent which dissolves 50 g or more of the phosphate ester component (A) in 100 g of the solvent at 25° C. is preferably used, and the solvent capable of dissolving the phosphate ester component (A) in the solvent at any given ratio is used preferably too. In this case, a solution containing the phosphate ester component (A) at a desired concentration can be prepared, and thereby a sufficient amount of the phosphate ester can be adsorbed on the surface of the metal pigment.

Examples of the preferred solvent include methanol, ethanol, 1-propanol, isopropyl alcohol, n-butanol, s-butanol, t-butanol, glycerin, allyl alcohol, ethylene glycol, ethylene glycol monoethyl ether, ethylene glycol monomethyl ether, ethylene glycol monomethoxymethyl ether, diethylene glycol, acetone, acetyl acetone, methyl ethyl ketone, diethyl ketone, cyclohexanone, diacetone alcohol, methyl isobutyl ketone, methyl-n-butyl ketone, methyl-n-propyl ketone, dimethyl sulfoxide, and the like.

<First Solvent>

As the first solvent, a solvent capable of serving as a good solvent for the phosphate ester component (A) is preferably used, and the same solvent as the solvent in the solution of the phosphate ester component (A) is preferably used.

<Second Solvent>

As the preferred second solvent, a solvent capable of providing a dispersion liquid, in which the phosphate ester component (A) is finely dispersed by mixing a solution containing the phosphate ester component (A) and the first solvent with the solvent, is preferably used. It is preferred that the second solvent in effect does not dissolve the phosphate ester component (A), and more specifically, the solubility of the phosphate ester component (A) in 100 g of the second solvent is 10 g or less at 25° C.

A preferred SP value of the second solvent is within a range from 7.2 to 9.0, and more preferably from 7.3 to 8.8, although it may differ according to the combination with a SP value of the first solvent that dissolves the phosphate ester component (A) or the use proportion. When the SP value is within a range from 7.2 to 9.0, the compatibility with the first solvent dissolving the phosphate ester component (A) is good, and therefore the dispersion size of the phosphate ester component (A) in the dispersion liquid becomes finer, to allow the phosphate ester to be adsorbed on the surface of the metal pigment uniformly.

As the combination of the first solvent and the second solvent, it is preferred that the proportion of the first solvent in the mixture solvent accounts for 2% by mass or more at 25° C., because the dispersion particle of the phosphate ester component (A) becomes finer. When the proportion is less than 2% by mass, the size of the dispersion particle becomes larger, and agglutination of the pigment tends to occur. It is more preferred that the proportion is 10% by mass or more. Incidentally, the proportion can be determined as less than 100% by mass, and may be a composition with which the phosphate ester component (A) is finely dispersed in the mixture solvent.

<Amount of Phosphate Ester Component (A) Used>

Since the amount of the phosphate ester component (A) to be used is determined according to the proportion to the amount of the metal pigment to be used, the amount per unit mass of the metal pigment is stated here. It is preferred that the amount of the phosphate ester component (A) to be used is from 0.2 to 3.0 times, more preferably from 1.0 to 2.0 times, the saturated adsorption amount of the phosphate ester to the metal pigment to be used. When it is 0.2 times or more, a good effect of improving water resistance is obtained due to contribution of the phosphate ester, and when it is 3.0 times or less, the phosphate ester adsorbing metal pigment is less likely to be poorly dispersed and thus poor color appearance is less likely to occur by the agglutination of the pigment. The saturated adsorption amount is considered in general to be within a range from about 0.5 to 5% by mass to the mass of the metal pigment, although it cannot be flatly determined as it changes according to a kind of a metal pigment, a specific surface area, a kind of a phosphate ester component (A) to be adsorbed, an adsorption temperature, and the like.

The saturated adsorption amount of the phosphate ester can be simply measured by the following method. A solvent of a metal pigment paste is replaced with a solvent (a) that favorably dissolves the phosphate ester. An excess phosphate ester is dissolved in the solvent (a) based on the estimated saturated adsorption amount, and the metal pigment replaced with the solvent (a) is dispersed thereto to make a slurry. The slurry is stirred to adsorb the phosphate ester onto the metal pigment. The slurry is filtered, and the residue (i.e., metal pigment) is fully washed with the solvent (a). The resultant slurry is dried to make a powdered sample, and the phosphorus content of the sample is measured by, for example, the following method.

About 1 g of the powdered sample is placed in a plastic vessel and precisely weighed. 15 ml of an aqueous 6N HCl solution and 2 ml of an aqueous 13N $HNO_3$ solution are added to the powdered sample to dissolve the metal components of the powdered sample completely. The resultant solution is filtered. The filtrate is poured into a 50 ml volumetric flask, and the inner wall of the apparatus and the adhering residue are washed with pure water into the flask. The volume is adjusted to 50 ml, and the concentration of phosphorus is measured at the wavelength of 178 nm using ICP (ICPS-8000 manufactured by Shimadzu Corporation), and the measurement value is converted into the amount of phosphorus. Separately, the residue and the filter paper are placed in a glass beaker, and about 10 ml of 6 N nitric acid and about 5 ml of 60% by mass perchloric acid are added to the glass beaker. The glass beaker is heated on a sand bath at 200° C. until the solid matter dissolves completely and the solution turns into transparent. Since nitric acid is evaporated during heating, nitric acid is added consecutively. When continuously heated, the liquid is evaporated to generate white smoke. When the white smoke is extinct, the beaker is cooled. 10 ml of an aqueous 6N HCl solution is added thereto, and the beaker is heated to dissolve the content completely. The volume of the liquid is adjusted with a 50 ml volumetric flask, the concentration of phosphorus is measured using ICP in the same manner as above, and the amount of phosphorus is calculated. The amounts of phosphorus obtained from the filtrate and the residue are summed up, and the phosphorus content is calculated from the weighed value of the powdered sample.

In the adsorption step, it is preferred to adjust the proportion in the amount of the metal pigment to the solution or dispersion liquid of the phosphate ester component (A), the content of the phosphate ester component (A) in the solution or dispersion liquid and the like so as to bring 0.3 to 10 parts by mass, preferably from 1 to 6 parts by mass, and more preferably from 2 to 5 parts by mass of the phosphate ester component (A) into contact with 100 parts by mass of the metal pigment. When the amount of the phosphate ester component (A) that is brought into contact with 100 parts by mass of the metal pigment is 0.3 parts by mass or more, a sufficient amount of the phosphate ester is adsorbed on the surface of the metal pigment, while when it is 10 parts by mass or less, the excessive supply of the phosphate ester component (A) is prevented, so that unnecessary increase in the production cost can be avoided, and also the agglutination of the phosphate ester absorbing metal pigment can be prevented.

In the resin-coated metal pigment of the present invention, it is preferred that the phosphorus content is within a range from 0.05 to 1.3 mg/m$^2$ per unit surface area of the resin-coated metal pigment. When the phosphorus content is 0.05 mg/m$^2$ or more, water resistance when being used as a paint is favorably exhibited, while when it is 1.3 mg/m$^2$ or less, unnecessary increase in the production cost can be prevented, and also the agglutination of the phosphate ester adsorbing metal pigment is prevented.

In the present invention, whether or not the phosphate ester is uniformly adsorbed on the surface of the metal pigment is confirmed by, for example, infrared spectroscopy such as microscopic infrared spectroscopy.

<Polymerization Component (B)>

It is preferred that the polymerization component (B) used in the present invention is a monomer and/or an oligomer having at least one polymerizable double bond, and preferably a combination of two or more kinds selected from the monomer and/or oligomer having at least one polymerizable double bond, from the viewpoints of prevention of agglutination accompanying polymerization, improvement in smoothness of a resin film (i.e., densification) and improvement of the alkali resistance accompanying thereto. Specifically, the monomer and oligomer disclosed in Japanese Patent Laying-Open No. 64-40566 is recommended. In the present invention, it is considered that excellent chemical resistance is exhibited when a film is formed using a paint containing the resin-coated metal pigment, because a resin film composed of the polymerization component (B) is formed on the surface of the metal pigment.

Examples of the polymerization component (B) are preferably at least one kind of, more preferably at least two kinds of, acrylates and methacrylates such as isoamyl acrylate, lauryl acrylate, stearyl acrylate, butoxyethyl acrylate, ethoxydiethylene glycol acrylate, methoxy-triethylene glycol acrylate, methoxy-polyethylene glycol acrylate, methoxydipropylene glycol acrylate, phenoxyethyl acrylate, phenoxypolyethylene glycol acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethylphthallic acid, 2-acryloyloxyethyl-2-hydroxyethylphthallic acid, triethylene glycol diacrylate, neopentyl glycol diacrylate, 1,6-hexanediol diacrylate, 1,9-nonanediol diacrylate, dimethylol-tricyclodecane diacrylate, trimethylol propane triacrylate, pentaerythritol triacrylate, pentaerythritol tetraacrylate, dipentaerythritol hexaacrylate, 2-hydroxy-3-acryloyloxypropyl methacrylate, isooctyl acrylate, isomyristyl acrylate, isostearyl acrylate, 2-ethylhexyl-diglycol acrylate, 2-hydroxybutyl acrylate, 2-acryloyloxyethyl hexahydrophthallic acid, hydroxypivalic acid neopentyl glycol diacrylate, polytetraethylene glycol diacrylate, ditrimethylolpropane tetraacrylate, methyl methacrylate, ethyl methacrylate, n-butyl methacrylate, isobutyl methacrylate, 2-ethylhexyl methacrylate, isodecyl methacrylate, n-lauryl methacrylate, tridecyl methacrylate, n-stearyl methacrylate, methoxydiethylene glycol methacrylate, methoxypolyethylene glycol methacrylate, cyclohexyl methacrylate, tetrahydrofurfural methacrylate, benzyl methacrylate, phenoxyethyl methacrylate, isobornyl methacrylate, 2-hydroxyethyl methacrylate, 2-hydroxypropyl methacrylate, 2-hydroxybutyl methacrylate, 2-methacryloyloxyethylsuccinic acid, 2-methacroyloxyethyl hexahydrophthallic acid, 2-methacryloyloxyethyl-2-hydroxypropyl phthalate, ethylene glycol dimethacrylate, diethylene glycol dimethacrylate, 1,4-butanediol dimethacrylate, 1,6-hexanediol dimethacrylate, 1,9-nonanediol dimethacrylate, trimethylolpropane trimethacrylate, glycerin dimethacrylate, 2-hydroxy-3-acryloyloxypropyl methacrylate, t-butyl methacrylate, isostearyl methacrylate, methoxytriethylene glycol methacrylate, n-butoxyethyl methacrylate, 3-chloro-2-hydroxypropyl methacrylate, triethylene glycol dimethacrylate, neopentyl glycol dimethacrylate, in addition, styrene, α-methylstyrene, vinyltoluene, divinylbenzene, acrylonitrile, methacrylonitrile, vinyl acetate, vinyl propionate, isoprene, chloroprene, vinylidene chloride, acrylamide, methyl vinyl ketone, phenyl vinyl ketone, methyl vinyl ether, phenyl vinyl ether, N-vinyl pyrrolidone, N-vinylcarbazole, polybutadiene, epoxidated polybutadiene, cyclohexene vinyl monoxide, and divinylbenzene monoxide. However, the component is not limited thereto. Among these, the use of a monomer and/or an oligomer having two or more polymerizable double bonds as the polymerization component (B) is advantageous in terms of further improvement in the chemical resistance because of formation of a resin coating layer containing a resin forming three-dimensional cross linkage.

<Slurry Preparation Step>

In the slurry preparation step, a slurry for polymerization is prepared, in which the phosphate ester adsorbing metal pigment is dispersed in a solvent for polymerization that will be described later, and also the polymerization component (B) is dispersed in the solvent for polymerization. A method for preparation of the slurry includes, for example, a method in which a pigment slurry is prepared by dispersing a phosphate ester adsorbing metal pigment in a solvent for polymerization, followed by mixing the pigment slurry with the polymerization component (B).

<Coating Step>

In the present invention, after the adsorption step of uniformly adsorbing the phosphate ester component (A) on the metal pigment, the polymerization component (B) is added thereto, a monomer and/or an oligomer of the polymerization component (B) is polymerized using a radical initiator or the like, and a resin coating layer is formed on the surface of the metal pigment. At this time, an adsorbing layer including the phosphate ester can be formed on the surface of the metal pigment by preliminarily polymerizing the phosphate ester component (A) adsorbed onto the metal pigment using a radical initiator or the like, and then the polymerization component (B) is added into the system and polymerized with a radical initiator or the like, to form the resin-coating layer including the polymerization component (B). Further, the resin coating layer may be formed by adding the polymerization component (B) to the metal pigment to which the phosphate ester is adsorbed, and then polymerizing the phosphate ester component (A) and the polymerization component (B) simultaneously with a radical initiator or the like. When the phosphate ester component (A) and the polymerization component (B) are simultaneously polymerized, a radical polymerizable double bond of the phosphate ester component (A) and a polymerizable double bond of the polymerization component (B) form a covalent bond between the phosphate ester component (A) and the polymerization component (B) and thereby a copolymer is formed, so that a more uniform and stronger adsorption layer and a resin coating layer are formed on the surface of the metal pigment. Accordingly, water resistance of the paint and chemical resistance of the film improve. Incidentally, the method disclosed in Japanese Patent Laying-Open No. 64-40566 can be applied to the coating step of the present invention, but the present invention is not limited thereto.

In the coating step, a solvent for polymerization is used when the polymerization component (B) is polymerized. As the solvent for polymerization, a solvent that does not dissolve the phosphate ester adsorbed on the surface of the metal pigment in the adsorption step is used, and the same solvent as the second solvent above may be used. Specifically, a solvent for polymerization having the solubility at 25° C. of the phosphate ester component (A) of 10 g or less with respect to 100 g thereof is used.

Examples of the preferable solvent for polymerization include aliphatic hydrocarbons such as hexane, heptane, octane, cyclohexane and mineral spirit, aromatic hydrocarbons such as benzene, xylene and toluene, halogenated hydrocarbons such as chlorobenzene, trichlorobenzene, perchloroethylene and trichloroethylene, alcohols such as methanol, ethanol, 1-propanol, isopropyl alcohol, n-butanol, s-butanol and t-butanol, ketones such as acetone, acetylacetone, methyl ethyl ketone, diethyl ketone, cyclohexanone, methyl isobutyl ketone, methyl-n-butyl ketone and methyl-n-propyl ketone, esters such as ethyl acetate and propyl acetate, and ethers such as tetrahydrofuran, diethyl ether and ethyl propyl ether.

It is preferred that a polymerization initiator is used in the coating step, and particularly, a radical initiator commonly known as a radical generator can be used. Specific examples of the polymerization initiator include peroxides such as benzoyl peroxide, lauroyl peroxide, isobutyl peroxide and methyl ethyl ketone peroxide, and azo compounds such as AIBN (azobisisobutyronitrile).

Here, it is preferred that the amount of the polymerization initiator to be mixed is 0.1 parts by mass or more based on 100 parts by mass of the polymerization component (B) to be fed, and more preferably 0.5 parts by mass or more. Further, it is preferred that the amount to be mixed is 10 parts by mass or less, and more preferably 8 parts by mass or less. It is preferred that the amount of the polymerization initiator to be mixed is 0.1 parts by mass or more, because the polymerization reaction proceeds certainly and an expected amount of a resin film is easily formed. It is preferred that the amount to be mixed is 10 parts by mass or less, because rapid processing of the polymerization is prevented, a polymer to be produced is adsorbed onto a metal pigment particle certainly, and rapid increase in viscosity of the entire system and coagulation due to the generation of a free polymer particle are prevented with the amount.

In the coating step, the polymerization reaction temperature is determined depending on a kind of a polymerization initiator to be used. The half life of the polymerization initiator is determined primarily by temperature. It is preferred that the temperature is adjusted such that the half life of the polymerization initiator is 5 minutes or more, and more preferably 15 minutes or more.

Also, it is preferred that the temperature is adjusted so as to make the half life of the polymerization initiator 20 hours or less, and more preferably 10 hours or less. When AIBN is used as the polymerization initiator, for example, the half life is 22, 5, 1.2 and 0.3 hours at 60, 70, 80 and 90° C., respectively, and therefore a range between 70 and 90° C. is a preferred temperature range. When the polymerization reaction is carried out at a temperature where the half life of the polymerization initiator becomes 20 hours or less, the temperature is preferred because a problem that the polymerization reaction hardly proceeds is less likely to occur, and when the polymerization reaction is carried out at a temperature with which the half life of the polymerization initiator becomes 5 minutes or more, the temperature is preferred because rapid proceeding of the polymerization reaction is prevented, a polymer to be generated is adsorbed to a metal pigment particle certainly, and rapid increase in viscosity of an entire system and coagulation due to generation of a free polymer particle are prevented.

In the coating step, it is of advantage to carry out the polymerization reaction under an inert gas atmosphere such as nitrogen, helium or argon in order to raise the polymerization yield.

The present invention also relates to a resin-coated metal pigment that has a metal pigment, a phosphate ester layer and a resin coating layer that coats the metal pigment with the phosphate ester layer interposed therebetween, wherein the phosphate ester layer is a phosphate ester containing phosphate mono- and/or di-esters having a radical polymerizable double bond or a homopolymer or a copolymer of phosphate mono- and/or di-esters, the resin coating layer is a homopolymer or a copolymer prepared by polymerization of a monomer and/or an oligomer having at least one polymerizable double bond, and the phosphorus content per unit surface area of the resin-coated metal pigment falls within a range from 0.05 to 1.3 mg/m$^2$.

The resin-coated metal pigment provides favorable water resistance when being used as a paint and favorable chemical resistance when being formed into a film because of the phosphate ester layer formed on the surface of the metal pigment, and the resin coating layer formed further thereon.

The phosphate ester layer can for example be formed by the adsorption step described above, and the resin coating layer can for example be formed by the coating step described above.

It is preferred that the resin coating layer contains a resin with three-dimensional cross linkage. In such a case, better chemical resistance is provided by the film. Incidentally, whether or not the resin coating layer contains a resin with three dimensional cross linkage can be confirmed, for example, by a dissolution extraction test using diverse solvent species.

<Paint>

The resin-coated metal pigment of the present invention can be used by mixing it with a known or common water base paint. An example of the preferred water base paint includes the water base paint containing the above described resin-coated metal pigment and a binder. These paints are not necessarily a one part type, but may be those used by mixing two or more parts and may be accompanied by a reaction. The water base paint containing the resin-coated metal pigment of the present invention can contain other pigments and dyes to serve for the intended color phase. However, it is desired that the other pigments are used within a range that the metallic texture of the pigment of the present invention is not damaged. The binder is not particularly limited as long as it is the one that is commonly used, but an emulsion binder is preferred. As the emulsion binder, various natural or synthetic polymers, oligomers, prepolymers or the like can be used. These paints can contain various additives according to need. Examples of the additives include a surfactant, a stabilizer, a corrosion inhibitor, a plasticizer, a pigment wetting agent, a pigment dispersing agent, a fluidity adjusting agent, a leveling agent, a fungicide, an ultraviolet absorber, and the like.

EXAMPLES

The present invention will now be described in detail by way of examples and comparative examples, but the present invention is not limited to the following examples.

<Evaluation on Amount of Resin Coated>

In about 100 g of normal hexane, about 20 g of a resin-coated metal pigment paste was dispersed and the dispersion liquid was filtered. The residue was fully washed with normal hexane on the filter, spread over a tray and dried overnight at 80° C. to give a powdered sample. About 1 g of the powdered sample was placed in a 500 ml plastic vessel and precisely weighed (the weight was defined as a). About 100 ml of a mixture acid (concentrated hydrochloric acid:concentrated nitric acid:water=1:1:2 (by volume)) was added into the above plastic vessel, and the mixture was stirred with a glass rod to dissolve the metal component in the powdered sample. Then, the content of the plastic vessel was filtered using a glass fiber filter a weight of which had been precisely weighed in advance (the weight was defined as b). The residue was fully washed with pure water on the glass fiber filter paper and then filtered. The glass fiber filter and the residue were transferred into another plastic vessel a weight of which had been precisely weighed in advance (the weight was defined as c), and all the residue adhering on the sidewall of the glass fiber filter was washed up with pure water into the plastic vessel. The content of the plastic vessel was dried overnight in an oven at 105° C., and then precisely weighed (the weight was defined as d). The amount of the resin to be coated (g) based on 100 g of the metal component was calculated from the following equation:

(Amount of resin to be coated based on 100 g of metal component)$(g)=(d-b-c)/(a-(d-b-c))\times 100$.

<Specific Surface Area>

The specific surface area of the resin-coated metal pigment or a metal pigment without resin coating was measured using an automatic specific surface area analyzer, Macsorb HM model-1208, manufactured by MOUNTECH Co., Ltd. The powdered sample prepared above was charged in an exclusive measuring vessel up to about 80% and precisely weighed. The weight was input in the measurement instrument. The resin-coated metal pigment was deaerated at 250° C. for 30 minutes, or the metal pigment without resin coating was deaerated at 350° C. for 30 minutes, and measurement was carried out under a mixture gas consisting of 30% by volume of nitrogen and 70% by volume of helium.

<Phosphorus Content>

About 1 g of the powdered sample prepared above was placed in a plastic vessel and precisely weighed. To the powdered sample, 15 ml of an aqueous 6N HCl solution and 2 ml of an aqueous 13N $HNO_3$ solution were added to completely dissolve the metal component in the powdered sample. The resultant solution was filtered. The filtrate was poured into a 50 ml volumetric flask, and the inner wall of the apparatus and the adhering residue were washed with pure water. The volume was adjusted to 50 ml, and the concentration of phosphorus was measured at a wavelength of 178 nm using ICP (ICPS-8000 manufactured by Shimadzu Corporation). The measurement value was converted into the amount of phosphorus. Separately, the residue and the filter paper were placed in a glass beaker, and about 10 ml of 6N nitric acid and about 5 ml of 60% by mass perchloric acid were added to the glass beaker. The glass beaker was heated on a sand bath at 200° C. until the solid matter dissolved completely and the solution turned into transparent. Since nitric acid was gradually evaporated during heating, nitric acid was added consecutively. When continuously heated, the liquid was evaporated to generate white smoke. When the white smoke was extinct, the beaker was cooled. Into the glass beaker, 10 ml of an aqueous 6N HCl solution was added, and the beaker was heated to dissolve the content completely. The volume of the liquid was adjusted with a 50 ml-volumetric flask, the concentration of phosphorus was measured using ICP in the same manner as above, and the amount of phosphorus was calculated. The amounts of phosphorus obtained from the filtrate and the residue were summed up, and the phosphorus content was calculated from the weight of the powdered sample.

<Alkali Resistance>

The resin-coated metal pigment was dispersed in an alkaline solution, being a mixture solvent, of polypropylene glycol monomethyl ether:aqueous 0.1N KOH solution=1:1 (by volume) with stirring at a constant temperature, and the amount of hydrogen gas generated due to degradation by an alkali was diachronically measured. As the results of measurement, the value Log (elapsed time) was plotted on the horizontal axis, and the amount of the gas generated was plotted on the vertical axis. The linear part in the range where the gas discharge velocity was stabilized was extrapolated as zero amount of the gas generated, and the onset time of gas discharge was defined as Log T. Since the onset time of gas discharge depends on the particle size of the metal pigment, the onset time of gas discharge of the material metal pigment was measured (it was defined as Log T') for correction, and alkali resistance was evaluated using the following equation:

Log $T$−Log $T'$=Log$(T/T')$=Δ Log $T$.

As Δ Log T increases, alkali resistance is excellent. The specific method will be described in the following.

The amount of the sample added to the alkaline solution above was 0.09 g as a metal component. Since the amount of the hydrogen gas that was diachronically generated was measured in the present measurement, it was necessary that the addition of the sample was carried out instantaneously and the system was closed instantaneously immediately after the addition in order to collect the gas to be generated. Therefore, the sample was dispersed in propylene glycol monomethyl ether to make a slurry, and 1 ml of the slurry was supposed to be added with a micropipette. The concentration of the slurry was adjusted so as to contain the sample in an amount of 0.09 g as a metal component in 1 ml of the added slurry. The sample slurry was prepared as follows. About 1 g of a powdered sample prepared in the same manner as above was placed in a plastic vessel and precisely weighed. The amount of the resin coated based on 100 g of the metal component of the sample was preliminarily measured. Here, when the metal component of the sample was aluminum and the amount of the resin coated based on 100 g of aluminum was defined as (A) g, propylene glycol monomethyl ether was added to the sample in an amount that the dilution rate became (1050/(100+A)) times the weight, and the mixture was stirred to be uniformly dispersed. Aluminum contained in 1 ml of the slurry was 0.09 g.

(Method for Measuring Amount of Gas Generated)

Figure 1:
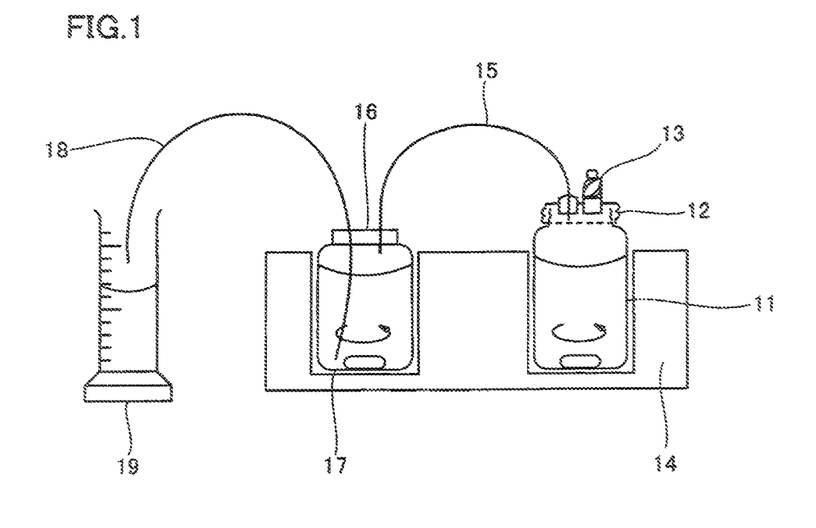
FIG. 1 is a schematic view showing an apparatus used for measurement of an amount of hydrogen gas generated.

FIG. 1 is a schematic view showing an apparatus used to measure an amount of a hydrogen gas generated. A 100 ml glass screw bottle sealed with a screw cap 12 is used as a reactor tank 11. A Teflon (registered trademark) two-way cock 13 is mounted on screw cap 12, to which a tip end of a micropipette can be inserted. An entire system is kept at a constant temperature (40° C.) by a dry bath 14 with a stirrer, and a reaction solution is constantly stirred with a stirrer tip. Immediately after charging a sample in, two-way cock 13 is closed to make the system a closed one. The hydrogen gas generated from the reactor tank reaches a water tank 17 by way of a Teflon (registered trademark) tube 15 and presses up water in the water tank. The water pressed up is poured into a measuring cylinder 19 by way of a Teflon (registered trademark) tube 18, so that the amount of a hydrogen gas generated is measured by measuring the water volume in the measuring cylinder.

(Measurement of Amount of Gas generated)

Using the apparatus shown in FIG. 1, the amount of the gas generated was measured. In reactor tank 11, 50 ml of an aqueous 0.1 N KOH solution and 50 ml of propylene glycol monomethyl ether were placed with a graduated transfer pipette, a stirrer tip was placed, and the reactor tank was set on dry bath 14 with a stirrer. A thermoelectric couple was inserted from two-way cock 13, and after confirming that the inner temperature reached 40±0.5° C., 1 ml of the slurry prepared by the above-described method was charged in reactor tank 11 with a micropipette. As the metal pigment, 7610N manufactured by TOYO ALUMINIUM K.K. was used. Immediately after completion of charging, two-way cock 13 was closed, and a stopwatch was started to record the elapsed time and the amount of the gas generated.

Figure 2:
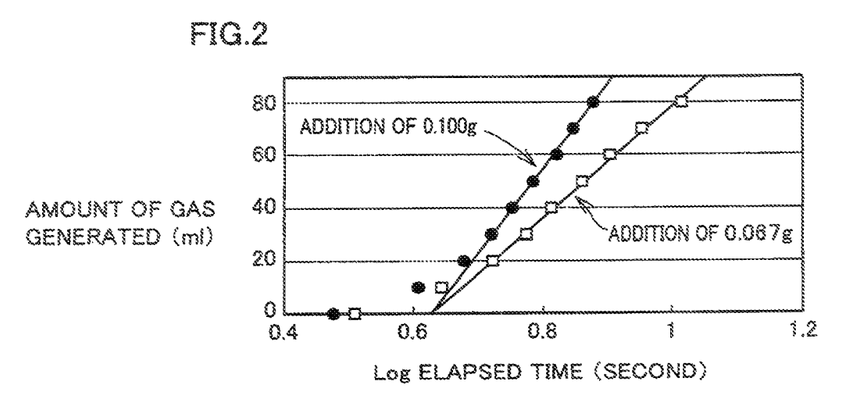
FIG. 2 is a graph showing a relation between Log (elapsed time) (second) and the amount of the gas generated, measured using the apparatus shown in FIG. 1.

FIG. 2 is a graph showing a relation between Log (elapsed time) (second) and the amount of the gas generated measured by the apparatus shown in FIG. 1. The elapsed time is shown by logarithm with a base of 60. For example, Log (elapsed time)=1 denotes 1 minute, and Log (elapsed time)=2 denotes 1 hour. In the region where the gas discharge velocity is stable, the plotted points on the coordinate with Log (elapsed time) on the horizontal axis and the amount of the gas generated on the vertical axis almost align on a linear line, so that the point where the linear part is extrapolated to zero amount of the gas generated (that is, intersection point with X-axis) is defined as the onset time of gas discharge, Log T. FIG. 2 shows an example using the same sample, but changing the amount of the sample to be added by way of changing the concentration of the slurry to be added. Although the gas discharge velocity depends on the amount of the sample to be added, Log T, a point where the linear part is extrapolated to zero amount of the gas generated, does not depend on the amount of the sample to be added. Accordingly it is learned that the amount of the sample to be added does not exert any effect on the data as long as the aluminum component is not far from 0.09 g. It was found that the error of Log T in the present measurement was about ±0.02 as a result of confirmation of repeated reproducibility.

The value of Log T depends on a particle size of the metal pigment. When the particle size of the metal pigment is less, the specific surface area in general tends to be greater, the contact area with an alkali increases and the onset time of gas discharge becomes shorter. In order to confirm the improvement effect of alkali resistance as a result of resin coating, correction has to be made for the effect incurred by the particle size of the metal pigment. Therefore, in each example and comparative example, the onset time of gas discharge was measured for the material aluminum pigment (it was defined as Log T'), and alkali resistance was evaluated from the following equation:

$$\text{Log } T - \text{Log } T' = \text{Log}(T/T') = \Delta \text{ Log } T.$$

That is to say, as $\Delta$ Log T increases, excellence in alkali resistance increases. The case where $\Delta$ Log T is 0.1 or more was rated as "Good", while the case of less than 0.1 was rated as "Poor".

<Water Resistance>

Using a sample paste of each example and each comparative example, a water base paint was prepared. A glass vessel was charged with 200 g of the water base paint. The vessel was allowed to stand in a constant temperature water circulation tank at 40° C. and the amount of the hydrogen gas generated was measured. Water resistance was evaluated by the amount of the gas generated 2 days after immersion in the constant temperature water tank. The case where the amount of gas generated 2 days after immersion in the constant temperature water tank was less than 5 ml was rated as "Good", while the case of 5 ml or more was rated as "Poor".

(Preparation of Water Base Paint)

A pigment paste (X) g that is equivalent to 7.5 g of the resin-coated metal pigment was placed in a plastic vessel, butyl cellosolve (15−(X)) g was added, and the mixture was fully stirred with a glass rod to be uniform. Then, 8.0 g of N-methyl pyrrolidone, followed by 28.0 g of pure water were added to the mixture in order, and the mixture was stirred to be uniform in the same manner each time a compound was added. To the slurry, 140 g of an aqueous acrylic emulsion (E-208 manufactured by Mitsui Chemicals, Inc.) was added, and stirred for 10 minutes by a mixer-type disperser to be uniform to give a water base paint. The pH of the water base paint was 7.56.

<Method for Manufacturing Coated Sheet>

The water base paint prepared was spray coated on a plastic sheet. The resultant sprayed coated sheet was dried at room temperature for about 5 minutes, and baked at 60° C. for 20 minutes to give a coated sheet. The coated sheet was coated so as to have a coated film thickness of 10 to 20 μm.

Each example and comparative example will be described hereinafter. Metal pigment pastes were all manufactured products obtained by washing with mineral sprit. That is, the metal pigment paste was washed twice with mineral sprit of the same kind as that contained in the paste, on a filter under suction filtration. The paste was then kneaded by a kneader mixer to be uniform, the amount of a nonvolatile component was measured, mineral spirit was added so as to set the amount of the nonvolatile component to the amount of the original paste, the paste was kneaded once again, and the nonvolatile component was adjusted and confirmed.

Example 1

In 640 g of methyl ethyl ketone (hereinafter referred to as MEK), 420 g of an aluminum paste containing an aluminum pigment as the metal pigment (7640NS manufactured by TOYO ALUMINIUM K.K., nonvolatile component of 65.1% by mass, average particle size of 16 μm, specific surface area of 5.5 m$^2$/g) was dispersed and the dispersion liquid was filtered. To the resultant filter paste, 400 g of MEK was further added to replace all of the solvent contained in the paste with MEK. A kneader mixer was charged with 440.7 g of the obtained paste, and the paste was kneaded for 10 minutes to be uniform. 10 g of the paste was taken out and the amount of the nonvolatile component was measured. The amount of the nonvolatile component was 60.0% by mass. This reveals that 258.4 g of the aluminum pigment was charged in the kneader mixer.

In 46.5 g of MEK, 5.17 g of 2-methacryloyloxyethyl acid phosphate (trade name: LIGHT ESTER P-1M manufactured by Kyoeisha Chemical Co., Ltd.) was dissolved. The resultant solution was slowly added to the above paste while the paste was being kneaded, and after adding the solution, the mixture was further kept kneading for 5 minutes to complete the adsorption step. The amount of the nonvolatile component was measured, and it was found that the amount of the nonvolatile component contained in the paste of the phosphate ester adsorbing metal pigment on which 2-methacryloyloxyethyl acid phosphate was adsorbed was 53.6% by mass. That is, the amount of the phosphate ester to be added was 2.0% by mass based on the aluminum pigment and when it was converted into per unit surface area of the aluminum pigment, it amounted to 3.7 mg/m$^2$.

In a 1 L-separable flask, 139.9 g of the above phosphate ester adsorbing metal pigment paste and 370.0 g of mineral spirit were placed and the mixture was stirred as introducing nitrogen gas, and the temperature of the system was raised to 80° C. Subsequently, 7.5 g of trimethylolpropane trimethacrylate (LIGHT ESTER TMP manufactured by Kyoeisha Chemical Co., Ltd.) was added thereto to complete the slurry preparation step. A solution of 0.75 g of azobisisobutyronitrile (reagent) dissolved in 8.5 g of MEK was added thereto, and the resultant solution was polymerized at 80° C. for 5 hours to carry out resin coating (coating step). After the completion of the polymerization, the slurry was cooled to room temperature, filtered, fully washed with mineral spirit and kneaded to be uniform, and a paste containing a resin-coated aluminum pigment was obtained as the resin-coated metal pigment. The nonvolatile component of the paste was 48.3% by mass, and the amount of the resin coated was 11.3 g based on 100 g of an aluminum component. As a result of quantitative analysis of phosphorus, the resin-coated aluminum pigment obtained by powdering the paste contained 0.29% by mass of phosphorus. According to the measurement of the specific surface area, it was found that the specific surface area of the resin-coated aluminum pigment was 8.2 m$^2$/g, and that the pigment contained 0.36 mg/m$^2$ of phosphorous when the measured value was converted into per unit surface area.

Example 2

In 640 g of MEK, 420 g of an aluminum paste containing an aluminum pigment as the metal pigment (1440YL manufactured by TOYO ALUMINIUM K.K., nonvolatile component of 71.0% by mass, average particle size of 31 μm, specific surface area of 1.7 m$^2$/g) was dispersed and the dispersion liquid was filtered. To the resultant filter paste, 400 g of MEK was further added to replace all of the solvent contained in the paste with MEK. A kneader mixer was charged with 455.8 g of the obtained paste, and the paste was kneaded for 10 minutes to be uniform. The amount of the nonvolatile component was measured as 64.6% by mass. This reveals that 288.0 g of the aluminum pigment was charged in the kneader mixer.

In 16.0 g of MEK, 1.78 g of 2-methacryloyloxyethyl acid phosphate of the same kind as in Example 1 was dissolved. The resultant solution was slowly added to the above paste while the paste was being kneaded, and after adding the solution, the mixture was further kept kneading for 5 minutes to complete the adsorption step. The amount of the nonvolatile component was measured, and it was found that the amount of the nonvolatile component contained in the paste of the phosphate ester adsorbing metal pigment on which 2-methacryloyloxyethyl acid phosphate was adsorbed was 61.5% by mass. The amount of the phosphate ester to be added was 0.6% by mass based on the aluminum and when it was converted into per unit surface area, it amounted to 3.6 mg/m$^2$.

In a 1 L-separable flask, 121.9 g of the above phosphate ester adsorbing metal pigment paste and 370.1 g of mineral spirit were placed and the mixture was stirred as introducing nitrogen gas, and the temperature of the system was raised to 80° C. Subsequently, 2.3 g of trimethylolpropane trimethacrylate was added thereto to complete the slurry preparation step. A solution of 0.75 g of azobisisobutyronitrile (reagent) dissolved in 19.1 g of MEK was added thereto, and the resultant solution was polymerized at 80° C. for 5 hours to carry out resin coating (coating step). After the completion of the polymerization, the slurry was cooled to room temperature, filtered, fully washed with mineral spirit and kneaded to be uniform, and a paste containing a resin-coated aluminum pigment was obtained as the resin-coated metal pigment. The nonvolatile component of the paste was 77.3% by mass, and the amount of the resin coated was 3.8 g based on 100 g of an aluminum component. As a result of quantitative analysis of phosphorus, the resin-coated aluminum pigment obtained by powdering the paste contained 0.10% by mass of phosphorus. According to the measurement of the specific surface area, it was found that the specific surface area of the resin-coated aluminum pigment was 2.0 m$^2$/g, and that the pigment contained 0.49 mg/m$^2$ of phosphorous when the measured value was converted into per unit surface area.

Example 3

In 640 g of MEK, 420 g of an aluminum paste containing an aluminum pigment as the metal pigment (5680NS manufactured by TOYO ALUMINIUM K.K., nonvolatile component of 70.8% by mass, average particle size of 8.7 μm, specific surface area of 10.4 m$^2$/g) was dispersed and the dispersion liquid was filtered. To the resultant filter paste, 400 g of MEK was further added to replace all of the solvent contained in the paste with MEK. A kneader mixer was charged with 449.5 g of the obtained paste, and the paste was kneaded for 10 minutes to be uniform. The amount of the nonvolatile component was measured as 64.1% by mass. This reveals that 281.7 g of the aluminum pigment was charged in the kneader mixer.

In 60.3 g of MEK, 10.7 g of 2-methacryloyloxyethyl acid phosphate of the same kind as in Example 1 was dissolved. The resultant solution was slowly added to the above paste while the paste was being kneaded, and after adding the solution, the mixture was further kept kneading for 5 minutes to complete the adsorption step. The amount of the nonvolatile component was measured, and it was found that the amount of the nonvolatile component contained in the paste of the phosphate ester adsorbing metal pigment on which 2-methacryloyloxyethyl acid phosphate was adsorbed was 57.0% by mass. The amount of the phosphate ester to be added was 3.8% by mass based on the aluminum and when it was converted into per unit surface area, it amounted to 3.6 mg/m$^2$.

In a 1 L-separable flask, 131.5 g of the above phosphate ester adsorbing metal pigment paste and 370.0 g of mineral spirit were placed and the mixture was stirred as introducing nitrogen gas, and the temperature of the system was raised to 80° C. Subsequently, 14.2 g of trimethylolpropane trimethacrylate was added thereto to complete the slurry preparation step. A solution of 0.75 g of azobisisobutyronitrile (reagent) dissolved in 13.8 g of MEK was added thereto, and the resultant solution was polymerized at 80° C. for 5 hours to carry out resin coating (coating step). After the completion of the polymerization, the slurry was cooled to room temperature, filtered, fully washed with mineral spirit and kneaded to be uniform, and a paste containing a resin-coated aluminum pigment was obtained as the resin-coated metal pigment. The nonvolatile component of the paste was 45.7% by mass, and the amount of the resin coated was 25.2 g based on 100 g of an aluminum component. As a result of quantitative analysis of phosphorus, the resin-coated aluminum pigment obtained by powdering the paste contained 0.48% by mass of phosphorus. According to the measurement of the specific surface area, it was found that the specific surface area of the resin-coated aluminum pigment was 15.0 m$^2$/g, and that the pigment contained 0.32 mg/m$^2$ of phosphorous when the measured value was converted into per unit surface area.

Example 4

In 640 g of MEK, 420 g of an aluminum paste of the same kind as in Example 1 was dispersed and the dispersion liquid was filtered. To the resultant filter paste, 400 g of MEK was further added to replace all of the solvent contained in the paste with MEK. A kneader mixer was charged with 454.0 g of the obtained paste, and the paste was kneaded for 10 minutes to be uniform. The amount of the nonvolatile component was measured as 59.5% by mass. This reveals that 264.2 g of the aluminum pigment was charged in the kneader mixer.

In 11.9 g of MEK, 1.3 g of 2-methacryloyloxyethyl acid phosphate of the same kind as in Example 1 was dissolved. The resultant solution was slowly added to the above paste while the paste was being kneaded, and after adding the solution, the mixture was further kept kneading for 5 minutes to complete the adsorption step. The amount of the nonvolatile component was measured, and it was found that the amount of the nonvolatile component contained in the paste of the phosphate ester adsorbing metal pigment on which 2-methacryloyloxyethyl acid phosphate was adsorbed was 56.7% by mass. The amount of the phosphate ester to be added was 0.5% by mass based on the aluminum and when it was converted into per unit surface area, it amounted to 0.9 mg/m².

In a 1 L-separable flask, 132.2 g of the above phosphate ester adsorbing metal pigment paste and 370.2 g of mineral spirit were placed and the mixture was stirred as introducing nitrogen gas, and the temperature of the system was raised to 80° C. Subsequently, 7.5 g of trimethylolpropane trimethacrylate was added thereto to complete the slurry preparation step. A solution of 0.75 g of azobisisobutyronitrile (reagent) dissolved in 8.7 g of MEK was added thereto, and the resultant solution was polymerized at 80° C. for 5 hours to carry out resin coating (coating step). After the completion of the polymerization, the slurry was cooled to room temperature, filtered, fully washed with mineral spirit and kneaded to be uniform, and a paste containing a resin-coated aluminum pigment was obtained as the resin-coated metal pigment. The nonvolatile component of the paste was 55.7% by mass, and the amount of the resin coated was 11.0 g based on 100 g of an aluminum component. As a result of quantitative analysis of phosphorus, the resin-coated aluminum pigment obtained by powdering the paste contained 0.06% by mass of phosphorus. According to the measurement of the specific surface area, it was found that the specific surface area of the resin-coated aluminum pigment was 7.0 m²/g, and that the pigment contained 0.09 mg/m² of phosphorous when the measured value was converted into per unit surface area.

Example 5

In 640 g of cyclohexanone, 400 g of an aluminum paste of the same kind as in Example 1 was dispersed and the dispersion liquid was filtered. To the resultant filter paste, 400 g of cyclohexanone was further added to replace all of the solvent contained in the paste with cyclohexanone. A kneader mixer was charged with 410.0 g of the obtained paste, and the paste was kneaded for 10 minutes to be uniform. The amount of the nonvolatile component was measured as 54.2% by mass. This reveals that 216.8 g of the aluminum pigment was charged in the kneader mixer.

In 10.9 g of cyclohexanone, 4.3 g of 2-methacryloyloxyethyl acid phosphate of the same kind as in Example 1 was dissolved. The resultant solution was slowly added to the above paste while the paste was being kneaded, and after adding the solution, the mixture was further kept kneading for 5 minutes to complete the adsorption step. The amount of the phosphate ester to be added was 2.0 g based on aluminum and when it was converted into per unit surface area, it amounted to 3.6 mg/m².

In a 2 L stainless steel beaker, 500 g of mineral spirit was placed and intensively stirred with a propeller stirrer. The paste prepared above was added into the beaker and the mixture was dispersed. The resultant slurry was filtered, 200 g of mineral spirit was further added thereto, and the solvent contained in the paste was replaced with mineral spirit once again. The nonvolatile component was measured and as a result, the nonvolatile component contained in the paste of the phosphate ester adsorbing metal pigment to which 2-methacryloyloxyethyl acid phosphate was adsorbed was 60.5% by mass.

In a 1 L-separable flask, 123.9 g of the above phosphate ester adsorbing metal pigment paste and 388.0 g of mineral spirit were placed and the mixture was stirred as introducing nitrogen gas, and the temperature of the system was raised to 80° C. Then, 6.1 g of epoxidated polybutadiene (trade name: ADK CIZER-BF-1000 manufactured by ADEKA CORPORATION) diluted to 50% by mass with mineral sprit, 3.5 g of trimethylolpropane triacrylate (trade name: TMPTA-N manufactured by DAICEL-UCB CO., LTD.), 1.0 g of divinylbenzene (trade name: DVB-570 manufactured by SANKYO CHEMICAL INDUSTRIES, LTD.) and 0.75 g of azobisisobutyronitrile (reagent) were added thereto, which was polymerized at 80° C. for 6 hours to carry out resin coating (coating step).

After the completion of the polymerization, the slurry was cooled to room temperature, filtered, fully washed with mineral spirit and kneaded to be uniform, and a paste containing a resin-coated aluminum pigment was obtained as the resin-coated metal pigment. The nonvolatile component of the paste was 52.4% by mass, and the amount of the resin coated was 10.2 g based on 100 g of an aluminum component. As a result of quantitative analysis of phosphorus, the resin-coated aluminum pigment obtained by powdering the paste contained 0.17% by mass of phosphorus. According to the measurement of the specific surface area, it was found that the specific surface area of the resin-coated aluminum pigment was 7.0 m²/g, and that the pigment contained 0.24 mg/m² of phosphorous per unit surface area.

Example 6

In a 1 L-separable flask, 115.2 g of the aluminum paste of the same kind as in Example 1 and 356.0 g of mineral spirit were placed and the mixture was stirred as introducing nitrogen gas, and the aluminum pigment was uniformly dispersed. In 36.5 g of MEK, 1.5 g of 2-methacryloyloxyethyl acid phosphate of the same kind as in Example 1 was dissolved, and the solution was slowly added dropwise to the slurry being stirred over 20 minutes using a dropping funnel. It was confirmed at this point that 2-methacryloyloxyethyl acid phosphate was finely dispersed in the slurry. The slurry was kept stirring for additional 40 minutes to adsorb phosphate ester to the aluminum pigment. The temperature of the system was raised to 80° C., to which 7.5 g of trimethylolpropane trimethacrylate, followed by a solution of 0.75 g of azobisisobutyronitrile (reagent) dissolved in 7.6 g of MEK were added. It was polymerized at 80° C. for 5 hours to carry out resin coating.

After the completion of the polymerization, the slurry was cooled to room temperature, filtered, fully washed with mineral spirit and kneaded to be uniform, and a paste containing a resin-coated aluminum pigment was obtained as the resin-coated metal pigment. The nonvolatile component of the paste was 58.4% by mass, and the amount of the resin coated was 11.7 g based on 100 g of an aluminum component. As a result of quantitative analysis of phosphorus, the resin-coated aluminum pigment obtained by powdering the paste contained 0.27% by mass of phosphorus. According to the measurement of the specific surface area, it was found that the specific surface area of the resin-coated aluminum pigment was 7.6 m²/g, and that the pigment contained 0.35 mg/m² of phosphorous when the measured value was converted into per unit surface area.

Comparative Example 1

The present comparative example was carried out by the method in accordance with Example 1 described in Japanese Patent Publication No. 01-049746. In the present comparative example, adsorption of phosphate ester onto the metal pigment was not carried out, and resin coating alone was carried out. In a 1 L-separable flask, 115.2 g of the aluminum paste of the same kind as in Example 1 and 440.0 g of mineral spirit were placed and the mixture was stirred as introducing nitrogen gas, and the temperature of the system was raised to 80° C. Then, 0.38 g of acrylic acid (manufactured by OSAKA ORGANIC CHEMICAL INDUSTRY LTD.) was added thereto to continue stirring at 80° C. for 30 minutes. The amount of acrylic acid to be added was 0.5% by mass based on aluminum, and when it was converted into per unit surface area, it was 0.9 mg/m$^2$. Next, 7.5 g of trimethylolpropane trimethacrylate and 0.75 g of azobisisobutyronitrile (reagent) were added to carry out polymerization at 80° C. for 5 hours.

After the completion of the polymerization, the slurry was cooled to room temperature, filtered, fully washed with mineral spirit and kneaded to be uniform, and a paste containing a resin-coated aluminum pigment was obtained. The nonvolatile component of the paste was 52.6% by mass, and the amount of the resin coated was 11.5 g based on 100 g of an aluminum component.

Comparative Example 2

The present comparative example was carried out by the method in accordance with Example 3 described in International Publication WO02/031061 Pamphlet. In the present comparative example, resin coating to the metal pigment was not carried out, and adsorption of phosphate ester alone was carried out. A kneader mixer was charged with 100 g of the aluminum paste of the same kind as in Example 1, and 20 g of 3-(2-ethylhexyloxy)propyl amine was added thereto and the mixture was kneaded for 5 minutes. To 100 g of an aqueous solution of hydrogen peroxide containing 30% by mass of hydrogen peroxide, 8 g of powdered metal molybdenum was added little by little, the mixture was reacted, the resultant solution was dissolved in 175 g of isopropyl alcohol, and the solution was added to the above paste and the mixture was kneaded at 60° C. for another one hour. 10 g of oleyl acid phosphate was dissolved in 100 g of dipropylene glycol monomethyl ether to make a solution, and the solution was added to the paste and the mixture was kneaded at room temperature for another 30 minutes. The nonvolatile component of the paste was measured as 63.2% by mass.

Comparative Example 3

The present comparative example was carried out by the method in accordance with Example 10 described in Japanese Patent Publication No. 01-049746. In a 1 L-separable flask, 115.2 g of the aluminum paste of the same kind as in Example 1 and 399.8 g of mineral spirit were placed and the mixture was stirred as introducing nitrogen gas, and the temperature of the system was raised to 80° C. Then, 0.39 g of 2-methacryloyloxyethyl acid phosphate of the same kind as in Example 1 was added thereto, and the paste was kept stirring at 80° C. for 30 minutes. The amount of the phosphate ester to be added was 0.5% by mass based on aluminum and when it was converted per unit surface area, it amounted to 0.9 mg/m$^2$. Next, 7.5 g of trimethylolpropane trimethacrylate (LIGHT ESTER TMP manufactured by Kyoeisha Chemical Co., Ltd.) and 0.75 g of azobisisobutyronitrile (reagent) were added to carry out polymerization at 80° C. for 5 hours.

After the completion of the polymerization, the slurry was cooled to room temperature and filtered, and then observed. Since it was found that a particle aggregate of about 1 mm was mixed, the slurry was wet-sieved using a screen with a mesh size of 150 μm and the particle aggregate was separated. The particle aggregate was then washed with hexane, and air-dried overnight. 0.48 g of the particle aggregate was obtained. The slurry that passed through the screen was filtered, fully washed with mineral spirit, and kneaded to be uniform to give a paste containing a resin-coated aluminum pigment. The nonvolatile component of the paste was 50.0% by mass, and the amount of the resin coated was 11.3 g based on 100 g of the aluminum component. As a result of quantitative analysis of phosphorus in the resin-coated aluminum pigment obtained by powdering the paste and the particle aggregate, phosphorus was not detected from the resin-coated aluminum pigment, and 12.82% by mass of phosphorus was detected from the particle aggregate.

Prior to the experiment of Comparative Example 3, as a preliminary test, 440 g of mineral spirit and 0.36 g of 2-methacryloyloxyethyl acid phosphate were placed in a 1 L-separable flask, and the mixture was stirred at 80° C. for 30 minutes as introducing nitrogen gas. In this system, 2-methacryloyloxyethyl acid phosphate was not dissolved at all in mineral spirit and phase separated.

TABLE 1

| | Examples | | | | | |
|---|---|---|---|---|---|---|
| | 1 | 2 | 3 | 4 | 5 | 6 |
| Aluminum pigment | 7640NS (Note 1) | 1440YL (Note 2) | 5680NS (Note 3) | 7640NS | 7640NS | 7640NS |
| Monomer species in adsorption step | MP (Note 4) | MP | MP | MP | MP | MP |
| Amount of monomer adsorbed (% by mass/Al) | 2.0 | 0.6 | 3.8 | 0.5 | 2.0 | 2.0 |
| Amount of monomer adsorbed (mg/m$^2$) | 3.7 | 3.6 | 3.6 | 0.9 | 3.7 | 3.7 |
| Amount of resin coated (g/100 g Al) | 11.3 | 3.8 | 25.2 | 11.0 | 10.2 | 11.7 |
| Specific surface area after resin coating (m$^2$/g) | 8.2 | 2.0 | 15.0 | 7.0 | 7.0 | 7.6 |
| Phosphorus content (% by mass) | 0.29 | 0.10 | 0.48 | 0.06 | 0.17 | 0.27 |
| Phosphorus content (mg/m$^2$) | 0.36 | 0.49 | 0.32 | 0.09 | 0.24 | 0.35 |
| Alkali resistance LogT | 0.80 | 1.10 | 0.68 | 0.73 | 0.90 | 0.80 |
| Alkali resistance ΔLogT | 0.22 | 0.46 | 0.16 | 0.15 | 0.31 | 0.22 |
| Water resistance Amount of paint gas generated (ml) | 0.0 | 2.6 | 0.1 | 0.3 | 0.7 | 3.6 |
| Evaluation on alkali resistance | Good | Good | Good | Good | Good | Good |
| Evaluation on water resistance | Good | Good | Good | Good | Good | Good |

TABLE 2

|  | Comparative Examples | | |
|---|---|---|---|
|  | 1 | 2 | 3 |
| Aluminum pigment | 7640NS | 7640NS | 7640NS |
| Monomer species in adsorption step | AA[Note 5] | — | MP |
| Amount of monomer adsorbed (% by mass/Al) | 0.5 | 0.0 | 0.5 |
| Amount of monomer adsorbed (mg/m$^2$) | 0.9 | 0.0 | 0.9 |
| Amount of resin coated (g/100 g Al) | 11.5 | 0.0 | 11.3 |
| Specific surface area after resin coating (m$^2$/g) | — | — | 7.2 |
| Phosphorus content (% by mass) | 0.00 | — | <0.02 |
| Phosphorus content (mg/m$^2$) | 0.00 | — | <0.03 |
| Alkali resistance  LogT | 0.65 | 0.58 | 0.57 |
| Alkali resistance  ΔLogT | 0.07 | −0.01 | −0.01 |
| Water resistance  Amount of paint gas generated (ml) | 10.0 | 0.0 | >20 |
| Evaluation on alkali resistance | Poor | Poor | Poor |
| Evaluation on water resistance | Poor | Good | Poor |

Note 1: 7640NS is manufactured by TOYO ALUMINIUM K.K. (nonvolatile component of 65.1% by mass, average particle size of 16 μm, specific surface area of 5.5 m$^2$/g).
Note 2: 1440YL is manufactured by TOYO ALUMINIUM K.K. (nonvolatile component of 71.0% by mass, average particle size of 31 μm, specific surface area of 1.7 m$^2$/g).
Note 3: 5680NS is manufactured by TOYO ALUMINIUM K.K. (nonvolatile component of 70.8% by mass, average particle size of 8.7 μm, specific surface area of 10.4 m$^2$/g).
Note 4: MP is 2-methacryloyloxyethyl acid phosphate (trade name: LIGHT ESTER P-1M) manufactured by Kyoeisha Chemical Co., Ltd.
[Note 5]AA is acrylic acid manufactured by OSAKA ORGANIC CHEMICAL INDUSTRY LTD.

As shown in Table 1 and Table 2, the results indicate that the performance of both alkali and water resistance is not good enough in Comparative Example 1 where acrylic acid was adsorbed onto the metal pigment, and then a resin coating layer was formed. The performance of alkali resistance in Comparative Example 2 is not good enough, where surface treatment for the purpose of providing water resistance was carried out, but neither adsorption of a phosphate ester nor formation of a resin coating layer were carried out. In Comparative Example 3, although a phosphate ester was brought into contact with the metal pigment before conducting a coating treatment to form a resin coating layer, the performance of both alkali and water resistance is not good enough since the phosphate ester was directly added to mineral spirit, a poor solvent for a phosphate ester, and therefore the phosphate ester was not brought into contact with the metal pigment in a dissolved state or a finely dispersed state.

On the other hand, it can be understood that, when the resin-coated metal pigment of Examples 1 to 6 were used, it is possible to reconcile water resistance of a water base paint and chemical resistance of a film at a favorable level.

It should be construed that embodiments and examples disclosed herein are only illustrative in all respects, and not limitative. It is intended that the scope of the present invention is indicated not by the description provided above but by the claims, and all meanings equivalent to the claims and all modification within the scope of claims are included in the present invention.

INDUSTRIAL APPLICABILITY

According to the present invention, it becomes possible to provide a resin-coated metal pigment for obtaining a water base paint having storage stability, particularly improved water resistance, and a film having improved chemical resistance. By using the resin-coated metal pigment of the present invention in a water base paint, a film having excellent chemical resistance is obtained even when a single-layered film is formed.

The invention claimed is:

1. A method for producing a resin-coated metal pigment comprising:
   an adsorption step of bringing a solution of a phosphate ester component (A) containing phosphate mono- and/or diesters having a radical polymerizable double bond, or a dispersion liquid containing said phosphate ester component (A) dispersed in a solvent into contact with a metal pigment to prepare a phosphate ester adsorbing metal pigment containing a phosphate ester adsorbed on the surface of said metal pigment;
   a slurry preparation step of preparing a slurry for polymerization obtained by dispersing said phosphate ester adsorbing metal pigment in a solvent for polymerization and dissolving a polymerization component (B) including a monomer and/or an oligomer having at least one polymerizable double bond in said solvent for polymerization; and
   a coating step of polymerizing said polymerization component (B) to form a resin coating layer on the surface of said phosphate ester adsorbing metal pigment, wherein
   said dispersion liquid is obtained by mixing a solution obtained by dissolving said phosphate ester component (A) in a first solvent, with a second solvent,
   said solvent for polymerization is a solvent having solubility at 25° C. of said phosphate ester component (A) of 10 g or less with respect to 100 g of said solvent, and
   a phosphorus content per unit surface area of said resin-coated metal pigment is within a range from 0.05 to 1.3 mg/m$^2$.

2. The method for producing a resin-coated metal pigment according to claim 1, wherein
   said slurry preparation step includes the steps of:
   preparing a pigment slurry in which said phosphate ester adsorbing metal pigment is dispersed in said solvent for polymerization; and
   mixing said polymerization component (B) with said pigment slurry.

3. The method for producing a resin-coated metal pigment according to claim 1, further comprising, after said absorption step, a step of polymerizing the phosphate ester adsorbed to said phosphate ester adsorbing metal pigment.

4. The method for producing a resin-coated metal pigment according to claim 1, wherein
   a polar solvent is used as a solvent in the solution of said phosphate ester component (A).

5. The method for producing a resin-coated metal pigment according to claim 1, wherein
   said second solvent is the same as said solvent for polymerization.

6. The method for producing a resin-coated metal pigment according to claim 1, wherein
   said phosphate ester component (A) is 2-methacryloyloxyethyl acid phosphate.

7. The method for producing a resin-coated metal pigment according to claim 1, wherein
   said polymerization component (B) includes a monomer having at least two polymerizable double bonds.

8. A water base paint comprising the resin-coated metal pigment prepared by the method according to any one of claims 1-6 and 7, and a binder.

9. The method for producing a resin-coated metal pigment according to claim 4, wherein the polar solvent comprises at least one solvent selected from the group consisting of ketone and alcohol.

* * * * *